May 13, 1969  H. C. HAAS ET AL  3,444,150
NOVEL HALOGEN-CONTAINING MONOMERS AND POLYMERS
Filed March 20, 1968  Sheet 1 of 4

INVENTORS
Howard C. Haas
and
Norman W. Schuler
BY Brown and Mikulka
and
Sheldon W. Rothstein
ATTORNEYS United States Patent Office 3,444,150
Patented May 13, 1969

3,444,150
NOVEL HALOGEN-CONTAINING MONOMERS AND POLYMERS
Howard C. Haas, Arlington, and Norman W. Schuler, Lexington, Mass., assignors to Polaroid Corporation, Cambridge, Mass., a corporation of Delaware
Continuation-in-part of application Ser. No. 637,311, Nov. 29, 1966. This application Mar. 20, 1968, Ser. No. 714,709
Int. Cl. C08f 3/52, 15/20; C07c 69/62
U.S. Cl. 260—85.7   31 Claims

ABSTRACT OF THE DISCLOSURE

Novel film-forming homopolymers and copolymers may be synthesized by reacting a novel monomer of the formula:

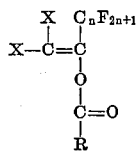

wherein R is selected from the group consisting of alkyl and phenyl radicals, each X is selected from the group consisting of hydrogen, fluorine and chlorine, and $n$ is an integer from 1 to 2, inclusive, with an ethylenically unsaturated monomer copolymerizable therewith.

---

This application is a continuation-in-part of our copending United States application Ser. No. 637,311 filed on Nov. 29, 1966 and now abandoned; which in turn is a continuation-in-part of our United States application Ser. No. 277,210 filed on May 1, 1963 and now abandoned.

The present invention is concerned with novel monomers and polymeric derivatives made therefrom.

Until the monomers of the present invention were synthesized, it was not possible to introduce vinyl alcohol-type residues into polymers of highly reactive monomers, such as styrene, by ordinary copolymerization techniques. However, by using the instant novel monomers it is now possible to introduce alcohol residues into polystyrene and other polymers prepared from monomers having similar Q (monomers reactivity) and e (charge density of the double bond) values using common free radical or UV catalyzed copolymerization techniques. Additionally, certain hydrolyzed copolymers of our novel monomers demonstrate insolubility in water and solubility in methanon; and dissolve in dilute alkaline solution to give the first known polymeric aliphatic alkoxides.

The above monomer classification system is in accordance with the Alfrey-Price scheme of describing monomer reactivity (J. Polymer Sci., 2, 101 [1947]).

In particular this invention relates to monomeric enol esters of halogenated acetones, and especially those with fluorine substituents.

Accordingly, one object of this invention is to provide novel monomers and novel copolymers derivable from said novel monomers.

Another object is to provide novel monomers which can be used to introduce alcohol residues into polymers derived from monomers with large Q and negative e values.

Still another object of this invention is to provide novel copolymers which precipitate from alkaline solution when the pH is lowered.

Other objects of this invention will in part be obvious and will in part appear hereinafter.

The invention accordingly comprises the process involving the several steps and the relation and order of one or more of such steps with respect to each of the others and the product possessing the features, properties and relation of elements which are exemplified in the following detailed disclosure, and the scope of the application of which will be indicated in the claims.

Figure 1:
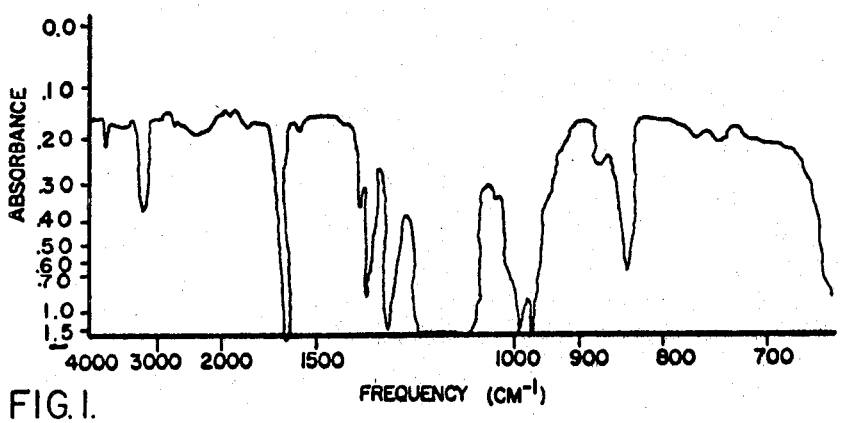
Figure 2:
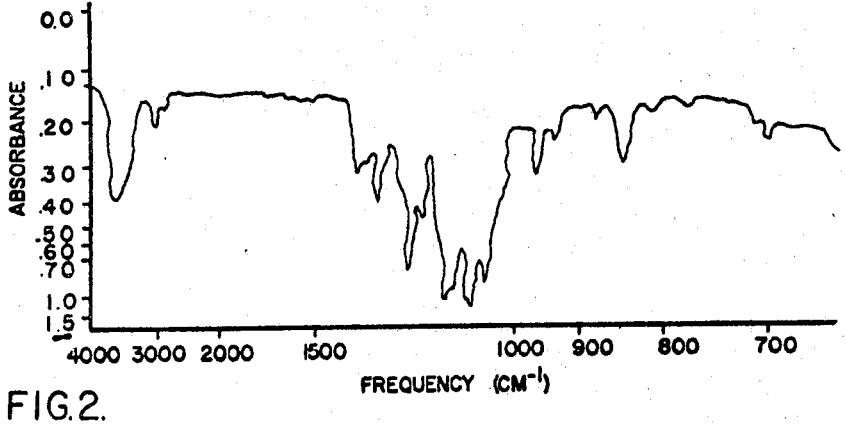
Figure 3:
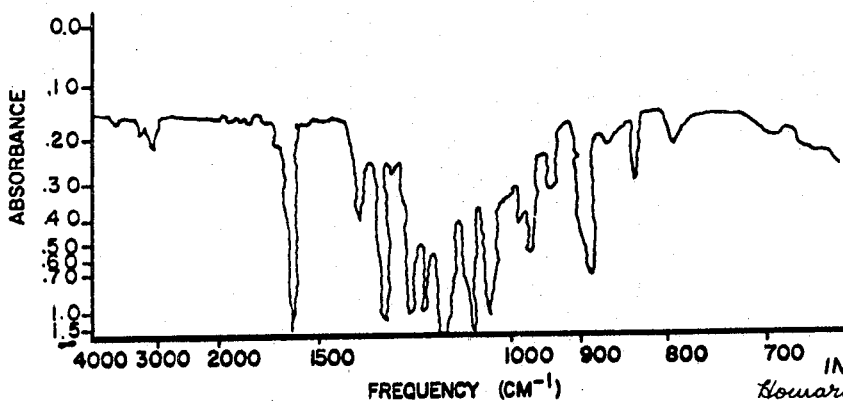
Figure 4:
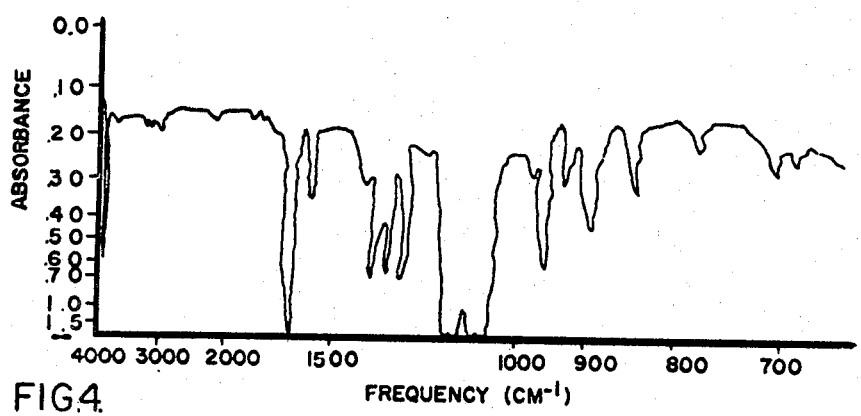
Figure 5:
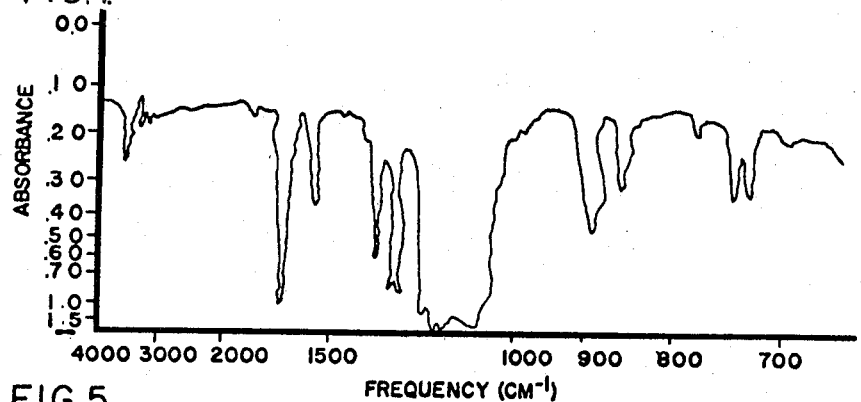
Figure 6:
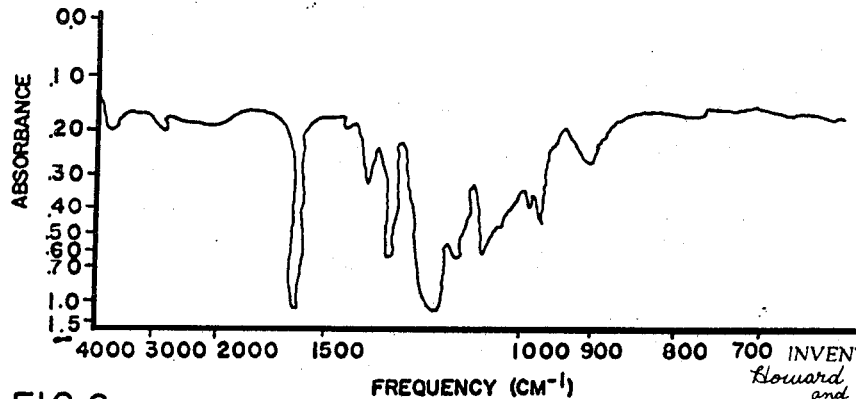
Figure 7:
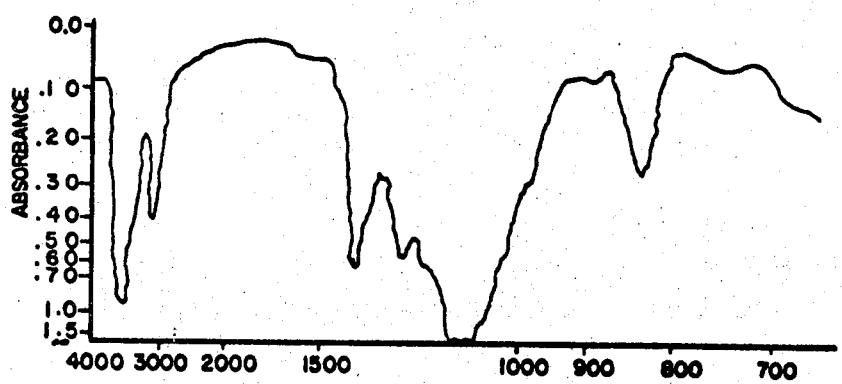
Figure 8:
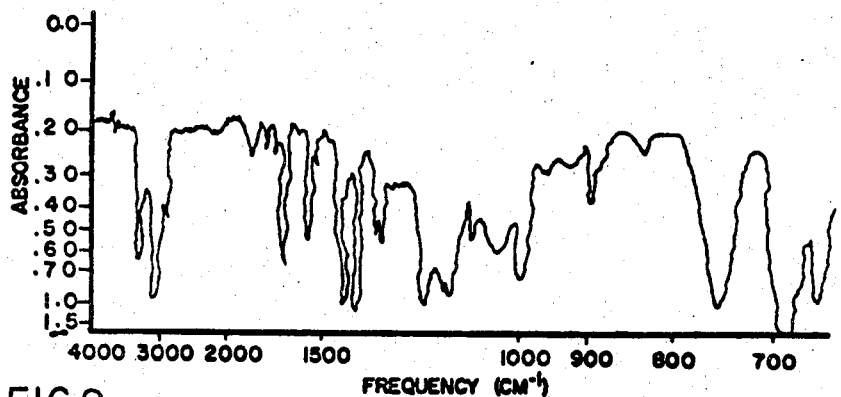
Figure 9:
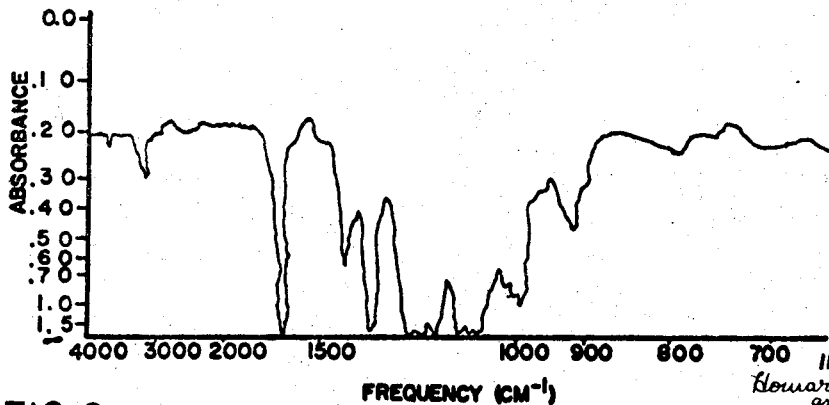
Figure 10:
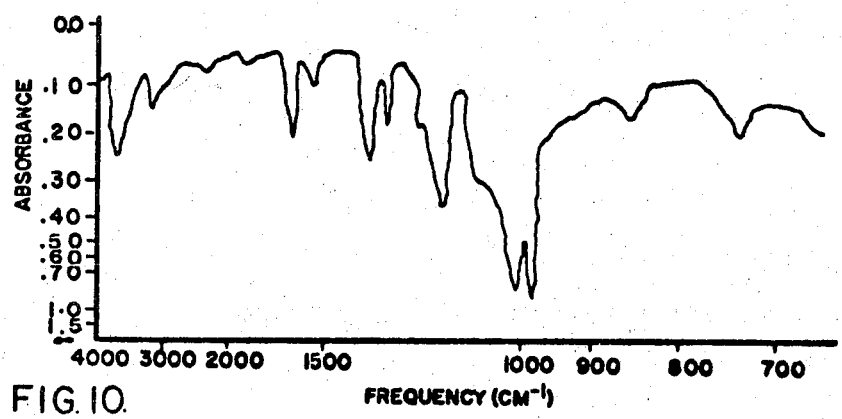
Figure 11:
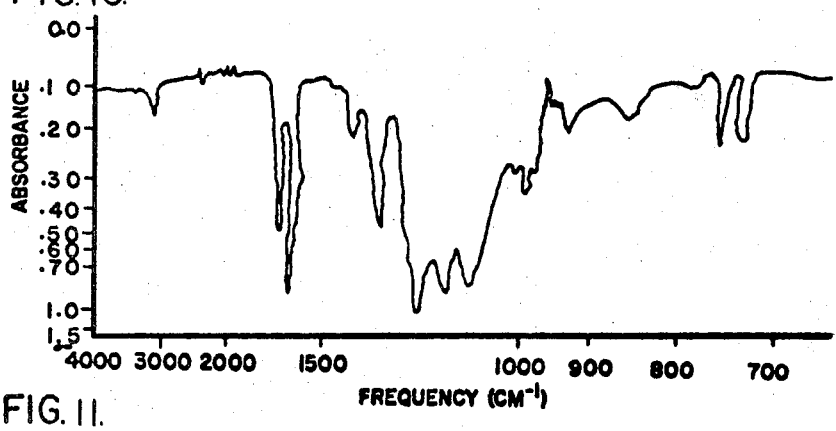
Figure 12:
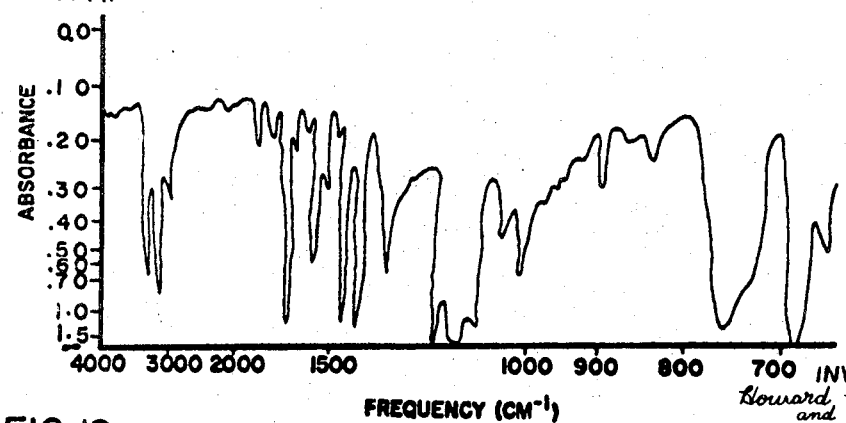

For a fuller understanding of the nature and objects of the invention, reference should be had to the following detailed description taken in connection with the accompanying drawing wherein:

FIGURE 1 is the infrared absorption spectrum of 3-bromo-1,1,1-trifluoropropanone;
FIG. 2 is the infrared absorption spectrum of 3-bromo-1,1,1-trifluoro-2-propanol;
FIG. 3 is the infrared absorption spectrum of 3-bromo-2-acetoxy-1,1,1-trifluoropropane;
FIG. 4 is the infrared absorption spectrum of 2-acetoxy-3,3,3-trifluoropropene;
FIG. 5 is the infrared absorption spectrum of 2-trifluoroacetoxy-3,3,3-trifluoropropene;
FIG. 6 is the infrared absorption spectrum of a vinyl acetate/2-acetoxy-3,3,3-trifluoropropene copolymer;
FIG. 7 is the infrared absorption spectrum of a trifluoromethyl-substituted polyvinyl alcohol;
FIG. 8 is the infrared absorption spectrum of a styrene/2-acetoxy-3,3,3-trifluoropropene copolymer;
FIG. 9 is the infrared absorption spectrum of a vinyltrifluoroacetate/2-acetoxy-3,3,3-trifluoropropene copolymer;
FIG. 10 is the infrared absorption spectrum of a vinylidene chloride/2-acetoxy-3,3,3-trifluoropropene copolymer;
FIG. 11 is the infrared absorption spectrum of a vinyl acetate/2 trifluoroacetoxy-3,3,3-trifluoropropene copolymer; and
FIG. 12 is the infrared absorption spectrum of a styrene/2 - trifluoroacetoxy-3,3,3-trifluoropropene copolymer.

The novel monomers within the scope of this invention may be represented by the formula:

(A) 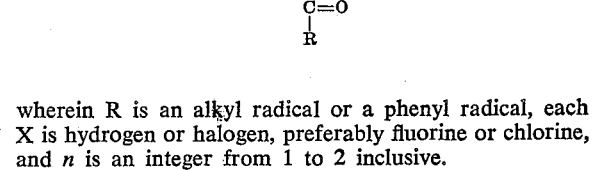

wherein R is an alkyl radical or a phenyl radical, each X is hydrogen or halogen, preferably fluorine or chlorine, and $n$ is an integer from 1 to 2 inclusive.

While it is preferable that R be a lower alkyl radical such as methyl, ethyl, propyl, butyl, etc. it should be understood that a higher alkyl radical such as octyl, lauryl, stearyl, etc. may be used. It should be further understood that within the scope of the instant invention, as claimed, R is intended to encompass the equivalents thereof and, accordingly, may comprise substituted or unsubstituted alkyl or phenyl groups to conform to the desires of the operator.

Though X may be only halogen, experimentation has shown that bromine and iodine are far inferior to fluorine and chlorine in the disclosed environment and are, therefore, contra-indicated as substituents in the monomers of the instant claimed invention.

In a preferred embodiment, R is a methyl group, X is hydrogen and $n$ is one. Such a monomer may be represented by the formula:

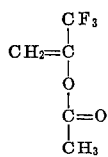

(1) 2-acetoxy-3,3,3-trifluoropropene.

As examples of other monomers within the scope of this invention, mention may be made of:

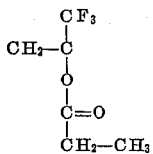

(2) 2-propionoxy-3,3,3-trifluoropropene;

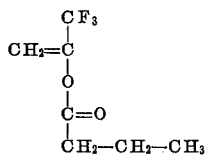

(3) 2-butyroxy-3,3,3-trifluroropropene;

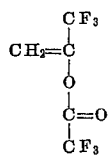

(4) 2-trifluoroacetoxy-3,3,3-trifluoropropene;

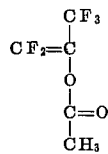

(5) 2-acetoxy-1,1-difluoro-3,3,3-trifluoropropene;

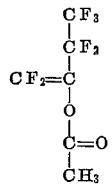

(6) 2-acetoxy-perfluoro-1-butene.

The novel monomers within the scope of this invention may be prepared by several methods. In one process, some monomers of this invention may be prepared directly by the reaction of a compound of the formula:

(B)
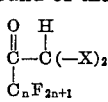

wherein X and $n$ have the same meaning as above, with an acid chloride or acid anhydride of the formulae:

(C)

or (D)
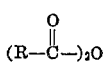

respectively. For example, trifluoroacetone may be reacted with trifluoroacetic anhydride to produce 2-trifluoroacetoxy-3,3,3-trifluoropropene.

The compounds within Formula (B) wherein X is hydrogen or fluorine may be reacted with phosphorus pentachloride and silver acetate, and the resulting product may then be cracked to yield the novel monomers of this invention.

2-acetoxy-3,3,3-trifluoropropene may also be prepared by reacting 2-trifluoroacetoxy-3,3,3-trifluoropropene with acetic acid and an acid catalyst.

Compounds such as esters of alpha-fluoromethacrylic acid and their polymers have been described in Patent No. 2,472,811, issued on June 14, 1949. It is evident that such compounds are composition isomers of the novel monomers of the present invention, the difference being in a transportation of oxygen atoms. The compounds are known as "reverse esters" of one another.

The only similarity between the instant compounds and those of the prior art is that they may have the same empirical formulae. This is merely an academic similarity since the properties possessed by the novel compounds of the instant invention differ markedly from those of the prior art compounds; such differences being attributable to the transposed oxygen atoms in the monomer molecule.

Initially it is noted that:

(1) Due to differences in reactivity attributable to the inversion of the oxygen atoms, in novel monomers of the present invention will not homopolymerize by ordinary free radical or ultraviolet catalyzed techniques while the monomers of the prior art homopolymerize readily;

(2) Hydrolysis of the novel monomers of the present invention results in an acid and a ketone, while hydrolysis of the monomer of the prior art results in an acid and an alcohol;

(3) Hydrolysis of the novel polymers of the present invention results in polyalcohols, while hydrolysis of the polymers of the prior art results in common polyacids.

(4) The ionization constants of hydrolyzed polymers of the present invention are substantially different than those of the hydrolyzed polymers made with monomers of the prior art.

The alpha-fluoromethacrylic acids, as disclosed in the patent cited above, are capable of introducing acid residues into polymers, e.g., polystyrene, by well-known copolymerization techniques. This is not a novel concept. Methods for introducing acid residues into reactive polymers by copolymerization with acrylic acid, methacrylic acid, crotonic acid, maleic anhydride, etc. have been known in the art for many years. It is well worth noting that even without the fluorine substituents which the above-cited art places on the methacrylic acid molecule, the monomer, methacrylic acid, will copolymerize well with reactive monomers. However, as pointed out herein, monomers like those of the instant invention, without fluorine substituents, will not copolymerize with reactive monomers by ordinary techniques.

Until the compounds of the present invention were synthesized the problem of producing copolymers containing aliphatic vinyl-type alcohol residues and residues of highly reactive monomers with negative 3 values had not been solved. This is due to the fact that vinyl esters and isopropenyl esters have Q's which are very low— that is, the monomers are substantially unreactive—and $e$'s which are very slightly negative, so that there will be no alternation effect with monomers having negative $e$ values. It has been determined that by placing the trifluoromethyl substituent on vinyl esters to yield isopropenyl esters of the type disclosed herein, the Q value of the monomer remains substantially unchanged while the polarity of the double bond is markedly altered and is made positive so that an alternating driving force for copolymerization with reactive monomers having negative $e$ values, e.g., styrene, is achieved.

Compounds similar to the novel monomers of the present invention, such as, for example, conventional isopropenyl acetate, are well known but undergo severe degradative chain transfer and result in polymers of such low molecular weights that they are of no commercial importance. This is due to the fact that in undergoing polymerization there is chain transfer of the hydrogen atoms of the methyl group resulting in stable free radicals so that very low molecular weights and inhibition to polymerization are observed. By replacing the hydrogen atoms on the methyl group with fluorines, according to the present invention, the predominant site for chain transfer has been removed and a useful, copolymerizable isopropenyl acetate, i.e., one which shows no marked inhibition to polymerization or degradative chain transfer, is formed.

It will be evident from the above discussion of the reactivities and other chemical differences between the instant monomers and those shown in the prior art renders each distinct from the other from both a utilitarian and an academic point of view.

A preferred method for preparing the novel monomers of this invention comprises the steps of brominating a compound within Formula (B), reducing the brominated compound, esterifying and dehydrobrominating.

The following nonlimiting examples illustrate the preparation of novel monomers within the scope of this invention:

EXAMPLE I

Preparation of 3-bromo-1,1,1-trifluoropropanone 80 gm. (0.5 mole) of bromine was added slowly, over a 2-hour period, to a solution of 112 gm. (1.0 mole) of trifluoroacetone in 270 ml. of concentrated sulfuric acid. The solution was kept under reflux while the bromine was added. A 63.4% yield of 3-bromo-1,1,1-trifluoropropanone, boiling at 85–96° C., was separated from the sulfuric acid. The infrared absorption spectrum of 3-bromo-1,1,1-trifluoropropanone is shown in FIGURE 1.

Preparation of 3-bromo-1,1,1-trifluoro-2-propanol

A cold solution of 63.7 gm. (0.03) mole) of 3-bromo-1,1,1-trifluoropropanone in 100 gm. of water was added gradually, with stirring, to a cold solution of 3.5 gm. (0.083 mole) of sodium borohydride in 250 gm. of water. After processing, the ether extract was rectified in a 26.5-plate column to yield 21.6 gm. (48.4%) of 3-bromo-1,1,1-trifluoro-2-propanol. The infrared absorption spectrum of 3-bromo-1,1,1-trifluoro-2-propanol is shown in FIG. 2.

Preparation of 3-bromo-2-acetoxy-1,1,1-trifluoropropane 162 gm. (.844 mole) of bromo-1,1,1-trifluoro-2-propanol was refluxed with 220 gm. (2.2 mole) of isopropenyl acetate and 1 gm. of p-toluene sulfonic acid. The reaction mixture was heated and acetone was removed through a 2-foot, packed column. The reaction mixture was then treated with an excess of sodium bicarbonate to remove the acid and was then distilled. After a forerun, the product was removed at 85° C. and 130 mm. pressure. 113 gm. of 3-bromo-2-acetoxy-1,1,1-trifluoropropane (58% yield) was collected, showing a specific gravity at 25° C. of 1.554 and refractive index of 1.3877. The infrared absorption spectrum of 3-bromo-2-acetoxy-1,1,1-trifluoropropane is shown in FIG. 3.

Preparation of 2-acetoxy-3,3,3-trifluoropropene 52 gm. (0.221 mole) of 3 - bromo-2-acetoxy-1,1,1-trifluoropropane was heated with 130 ml. of freshly distilled tributylamine at 175–190° C. A 64% yield of the crude novel monomer, 3,3,3-trifluoro-2-acetoxypropene was removed at 75 to 95° C. After refractionation, the monomer showed the following analysis; boiling point of 86.5° C., specific gravity at 25° C. of 1.2119 and refractive index of 1.3380. The elemental analysis showed the following:

Calculated: C, 39.0; H, 3.7; F, 37.0. Found: C, 39.3; H, 3.8; F, 35.7.

The infrared absorption spectrum of the monomer is shown in FIG. 4.

3,3,3-trifluoro-2-acetoxypropene was also prepared according to the procedure of Example I wherein the reduction of 3-bromo-1,1,1-trifluoropropanone was accomplished with lithium aluminum hydride (to give a 50% yield) and with aluminum isopropoxide (to give a 48.8% yield).

EXAMPLE II

Trifluoroacetone (50 gm.; 0.446 mole), trifluoroacetic anhydride (50 gm.; 0.238 mole) and potassium acetate (3.0 gm.) were heated in a steel bomb at 100° C. for 16 hours. The reaction mixture was fractionated and 20 gm. of 2-trifluoroacetoxy - 3,3,3 - trifluoropropene, boiling at 57° C. were recovered. The infrared absorption spectrum of the monomer is shown in FIG. 5.

As pointed out above, the monomers of the present invention will not homopolymerize by ordinary free radical or UV techniques. However, they do form copolymers readily with a variety of monomers containing at least one ethylenically unsaturated group to produce novel copolymers. Examples of such monomers are the following:

| | |
|---|---|
| vinyl acetate | allyl halides |
| styrene | 2-vinylpyridine |
| vinyltrifluoroacetate | 4-vinylpyridine |
| vinylidene chloride | isobutylene |
| vinyl chloride | tetrafluoroethylene |
| vinyl bromide | chlorotrifluoroethylene |
| ethylene | vinylidene fluoride |
| propene | vinyl fluoride |
| vinyl ethers | |

The polymerizations may be catalyzed by various means such as, for example, heat, ultraviolet light and free radical catalysts. As examples of such catalysts, mention may be made of azobisisobutyronitrile, diazoaminobenzene, benzoyl peroxide, tertiary butyl peroxide, tertiary butyl hydroperoxide, diacetyl peroxide, diethyl peroxycarbonate, hydrogen peroxide and potassium persulfate.

As noted above, monomers such as vinyl acetate or isopropenyl acetate will not copolymerize to any extent with styrene whereas the novel monomers of this invention form copolymers with styrene readily. This is probably due to the fact that the —CF$_3$ group provides a positive charge on the double bond, thereby increasing the tendency toward alternation.

The following nonlimiting examples illustrate the preparation of the novel copolymers within the scope of this invention:

EXAMPLE III

Vinylacetate/2-acetoxy-3,3,3-trifluoropropene copolymer

A polymerization tube was charged with 1 gm. of freshly distilled vinyl acetate, 1 gm. of 2-acetoxy-3,3,3-trifluoropropene and 0.008 gm. of azobisisobutyronitrile. The tube was sealed under vacuum and heated at 70° C. for 12 hours. The resulting colorless, glassy copolymer was dissolved in acetone and was purified by being precipitated into hexane twice. The polymer is soluble in benzene, acetone, chloroform, methylene chloride, and ethyl acetate. It is insoluble in ethanol but swells in methanol. The infrared absorption spectrum of the copolymer is shown in FIG. 6.

EXAMPLE IV

Vinylacetate/2-acetoxy-3,3,3-trifluoropropene copolymers

A polymerization tube was charged with 1 gm. of freshly distilled vinyl acetate and 1 gm. of 2-acetoxy-3,3,3-trifluoropropene and exposed to ultraviolet radiation from a General Electric 100 watt AH–4 lamp for six days. The copolymer was purified as in Example III.

It will be evident that the novel polyesters of the instant invention may be hydrolyzed to the corresponding polyalcohols. This process is described in the following example.

EXAMPLE V 0.5 gm. of the vinylacetate/2-acetoxy-3,3,3-trifluoropropene copolymer prepared according to the method set forth in Examples III and IV was swelled in methanol and a small amount of sodium methoxide was added whereupon the polymer dissolved. The solution was heated at reflux for 0.5 hour and the resulting polymer was isolated by precipitation into benzene and purified by reprecipitation from methanol into water. The novel polymer is a polyvinyl alcohol which has some carbons which contain both the hydroxyl radical and a trifluoromethyl radical, e.g.

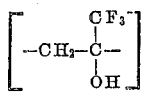

and is insoluble in water, soluble in methanol and soluble in aqueous alkali. The purified, dried polymer had a fluorine analysis of 29.05% ultraviolet absorption spectra of the methanol solutions of the polymer showed bands at 220, 280 and 330 m$\mu$. The infrared absorption spectrum of the novel polymer is shown in FIG. 7. Strong absorption appears in the 1100–1200 cm.$^{-1}$ region.

EXAMPLE VI 0.5 gm. of the vinylacetate/2-acetoxy-3,3,3-trifluoropropene, prepared according to the method set forth in Examples III or IV was dissolved in a benzene-methanol mixture. Anhydrous hydrogen chloride was bubbled through the solution and the solution was refluxed for 180 hours. The polymer was isolated, washed with water and dried. The polymer prepared in this manner had the same properties and structure as the polymer prepared according to Example V. However, alcoholysis takes place much slower with hydrogen chloride than with sodium methoxide.

EXAMPLE VII

Styrene/2-acetoxy-3,3,3-trifluoropropene copolymer

A polymerization tube was charged with 0.7 gm. of 2-acetoxy-3,3,3-trifluoropropene, 0.7 gm. of styrene and 0.0056 gm. of azobisisobutyronitrile. The tube was sealed under vacuum and heated at 70° C. for 16 hours. The viscous colorless solution was poured into hexane to isolate the copolymer. It was purified by two precipitations from acetone into hexane. The styrene/2-acetoxy-3,3,3-trifluoropropene copolymer is soluble in acetone, benzene, chloroform, ethyl acetate and methylene chloride and is insoluble in alcohol. The infrared absorption spectrum of the novel copolymer is shown in FIG. 8.

EXAMPLE VIII

Vinyltrifluoroacetate/2-acetoxy-3,3,3-trifluoropropene copolymer

A polymerization tube was charged with 0.7 gm. of 2-acetoxy-3,3,3-trifluoropropene, 0.7 gm. of vinyltrifluoroacetate and 0.0056 gm. of azobisisobutyronitrile. The tube was sealed under vacuum and heated at 70° C. for 40 hours. The viscous, pale yellow solution was poured into hexane to isolate the copolymer. It was purified by two reprecipitations from acetone into hexane. The polymer is soluble in acetone, ethylacetate, benzene and methylene chloride. It is insoluble but swells in chloroform and methanol. The infrared absorption spectrum of the novel copolymer is shown in FIG. 9.

EXAMPLE IX

Vinylidene chloride/2-acetoxy-3,3,3-trifluoropropene copolymer

A polymerization tube was charged with 0.7 gm. of vinylidene chloride, 0.7 gm. of 2-acetoxy-3,3,3-trifluoropropene and 0.0056 gm. of azobisisobutyronitrile. The tube was sealed under vacuum and heated at 70° C. for 16 hours. The polymer precipitated out of solution. It was purified by precipitation from tetrahydrofran into hexane.

The polymer is insoluble in most common organic solvents except tetrahydrofuran and dioxane. The infrared absorption spectrum of the novel copolymer is shown in FIG. 10.

EXAMPLE X

Vinyl acetate/2-trifluoroacetoxy-3,3,3-trifluoropropene

A polymerization tube was charged with 1 gm. of 2-trifluoroacetoxy-3,3,3-trifluoropropene, 1 gm. of vinyl acetate and 0.008 gm. of azobisisobutyronitrile. The tube was sealed under vacuum and heated at 70° C. for 16 hours. The resulting solid, opaque, light orange copolymer was twice dissolved in acetone and precipitated into hexane and dried. The infrared absorption spectrum of the novel copolymer is shown in FIG. 11.

EXAMPLE XI

Styrene/2-trifluoroacetoxy-3,3,3-trifluoropropene

A polymerization tube was charged with 1 gm. of 2-trifluoroacetoxy-3,3,3-trifluoropropene, 1 gm. of styrene and 0.008 gm. of azobisisobutyronitrile. The tube was sealed under vacuum and heated at 70° C. for 16 hours. The resulting solid copolymer was twice dissolved in benzene and precipitated into methanol and dried. The infrared absorption spectrum of the novel copolymer is shown in FIG. 12.

It has also been found that novel copolymers may be formed with the novel fluoro monomers of this invention wherein R is an unsubstituted alkyl radical, by emulsion polymerization as well as bulk polymerization. The following nonlimiting example illustrates the preparation of a copolymer within the scope of this invention by emulsion polymerization.

EXAMPLE XII

Vinyl acetate/2-acetoxy-3,3,3-trifluoropropene

A polymerization tube was charged with 1 gm. of vinyl acetate, 1 gm. of 2-acetoxy-3,3,3-trifluoropropene, 5 ml. of water containing 0.002 gm. of potassium persulfate and 0.04 gm. of sodium lauryl sulfate, sold by E. I. du Pont de Nemours, Inc., Wilmington, Del., under the trade name "Duponol C." The tube was sealed under nitrogen and tumbled for 16 hours at a temperature of 70° C. 0.2 gm. of the copolymer was isolated.

As has been suggested above, homopolymers of the novel monomers of the instant invention may not be formed by ordinary free radical or UV techniques. It has been found, however, that such homopolymers may be synthesized by utilizing certain techniques which would be considered extraordinary in the polymer chemistry field, as described in the following examples.

EXAMPLE XIII 5 gms. of α-trifluoromethyl vinyl acetate and 0.5% by weight of pyridine were heated in a sealed tube at 70° C. for four days. Upon subsequent heating the originally clear solution gradually became darker followed by the separation of an oily layer. The oily layer was purified by several precipitations from acetone into water and was identified as poly-α-trifluoromethyl vinyl acetate using IR analysis. When cast from acetone the polymer yielded a slightly brown-colored solid coherent film.

EXAMPLE XIV 5 gms. of α-trifluoromethyl vinyl acetate and 10% by weight of benzoyl peroxide were heated in a sealed evacuated tube at 70° C. for eight days. A white solid polymeric material was obtained upon precipitation into hexane. This material was identified by infrared spectrum analysis as poly-α-trifluoromethyl vinyl acetate. It was cast from acetone and produced a solid coherent film.

EXAMPLE XV 5 gms. of α-trifluoromethyl vinyl acetate was sealed in an evacuated tube and irradiated with a General Electric AH–4 Ultraviolet Lamp which was approximately three inches away, said lamp having had the outer Pyrex glass piece removed thereby allowing high energy light to irradiate the monomer. The irradiation was carried out for about three days. During this time viscosity underwent an increase and a polymeric material was obtained upon precipitation into hexane. It was identified by infrared analysis as poly-α-trifluoromethyl vinyl acetate.

By means of the novel monomers of this invention, it is now possible to introduce vinyl alcohol-type units into styrene and vinyl pyridine-type structures. The introduction of hydroxyl groups into polymers like styrene increases the dyeability of the polymers.

The novel polymers of this invention are also suitable for use as films and fibers. It has been observed that polymers of the present invention, e.g., vinyl acetate-α-trifluoromethyl vinyl acetate, etc. are fibrous in appearance upon precipitation into hexane, and, on differential thermal analysis using a du Pont Model 900 Differential Thermal Analyzer yield thermograms which are characteristic of crystalline polymers. Annealing of, for example, a 1:1 copolymer of vinyl acetate-α-trifluoromethyl vinyl acetate for one hour results in a sharpening of the apparent first order transition endotherm and a distinct difference in the heat capacities of the solid and molten phases. Stretching films of this copolymer results in marked fibrillation completely unlike polyvinyl acetate. A sample of this copolymer was melted and heated until the viscosity of the melt was suitable for drawing fibers, for example, about 150° C. A metal rod was inserted into the melt and fibers were drawn therefrom. Qualitatively, these fibers were physically superior to those drawn from molten polyvinyl acetate. At the same time infrared dichroism measurements on oriented specimens shows little, if any, dichroism for the various infrared absorption bands. It may be concluded, therefore, that the introduction of the $CF_3$ groups into vinyl ester polymers exerts a remarkable effect on their physical properties.

The alcoholysis of copolymers comprising vinyl acetate and α-trifluoromethyl vinyl acetate produces polyols which are water-insoluble. Differential thermal and thermal mechanical analyses place the glass transition for equimolar polyols somewhere between 46° and 49° C. which is considerably below the glass transition temperature of 85° for unmodified polyvinyl alcohol. Metastable crystalline forms that result in the first order endothermic transitions in the range of 100–250° C. are noted. A fairly reproduceable first order endotherm is observed at 220° C.

Besides being water-insoluble, the polyols described above are soluble in dilute alkali to yield polyalkoxide-type solutions and demonstrate some other interesting properties. For example, introduction of the $CF_3$ groups has reduced the refractive index to $n_D{}^{25} = 1.435$, considerably below the range of 1.49 to 1.53 reported for ordinary PVA. Films of these fluoropolyols when cast on glass demonstrate remarkable adhesion and are much harder to ignite and burn far more slowly than ordinary polyvinyl alcohol.

The trifluoromethyl substituted polyvinyl alcohols, e.g., polyvinyl alcohol which contains

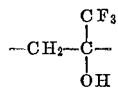

residues in the chain, possess unexpected and unusual properties. As stated above, the novel trifluoromethyl substituted polyvinyl alcohol is soluble in methanol, totally water insoluble, is swelled by acetone and dissolves in dilute aqueous alkaline solutions to yield polyelectrolyte solutions. The trifluoromethyl substituted polyvinyl alcohol is the first polyelectrolyte of which the inventors are aware that is an aliphatic polyalkoxide in alkaline solution.

Trifluoromethyl-substituted polyvinyl alcohol films may be cast from methanol, hexafluoroisopropenol or ammoniacal water-alcohol solutions. Films so prepared are clear, relatively tough and more slippery to the touch than unsubstituted polyvinyl alcohol. The films may be oriented by stretching.

Trifluoromethyl substituted polyvinyl alcohol is especially useful in preparing water insoluble fibers and films. The novel polymer may also be used to convert easily wettable polar hydrophilic surfaces to a more hydrophobic surface. Additionally, it is disclosed as being an ideal film former and preferential adherent in copending application Ser. No. 482,620, filed Aug. 25, 1965 now U.S. Patent No. 3,362,822.

In addition to the various uses cited above for the polymers of the present invention novel fluoroalkyl containing polyols within the present invention have been found to provide efficient dichroic polarizers and can be prepared by treating oriented films of these polyols with aqueous potassium iodide-iodine solutions. Due to the presence of the fluoroalkyl groups on the backbone of the polymer chain, polarizers made thereof are substantially more hydrophobic than well-known polarizers made with a polyvinyl alcohol stratum. The technique utilized to prepare such polarizers is described in U.S. Patent No. 2,237,567 and generally comprises treating the film material with an aqueous sorption complex such as, for example, a dichroic stain, iodine or polyiodide, or other known dye material. Further moisture resistance and additional stability to prolonged exposure at relatively high temperatures may be imparted to the polarizers described herein by incorporating in said polarizers a sodium or potassium borate substance as disclosed in U.S. Patent No. 2,554,850. The polarizers of the present invention are slightly less neutral and more bluish in appearance than comparative polarizers comprising a polyvinyl alcohol stratum and show maximum dichroism at about 600 mμ.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A novel monomer of the formula:

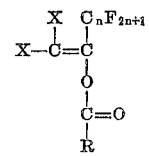

wherein R is selected from the group consisting of alkyl and phenyl radicals, each X is selected from the group consisting of hydrogen, fluorine and chlorine, and $n$ is an integer from 1 to 2, inclusive.

2. A monomer as defined in claim 1 wherein R is a methyl radical.

3. A monomer as defined in claim 1 wherein R is a trifluoromethyl radical.

4. A monomer as defined in claim 1 wherein each X is hydrogen.

5. A monomer as defined in claim 4 wherein R is an alkyl group.

6. A monomer as defined in claim 5 wherein $n$ is 1.

7. A monomer as defined in claim 1, which is 2-acetoxy-3,3,3-trifluoropropene.

8. A monomer as defined in claim 1, which is 2-trifluoroacetoxy-3,3,3-trifluoropropene.

9. A film-forming addition homopolymer comprising a polymerized monomer of the formula:

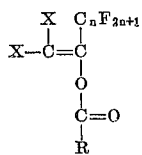

wherein R is selected from the group consisting of alkyl and phenyl radicals, each X is selected from the group consisting of hydrogen, fluorine and chlorine, and $n$ is an integer from 1 to 2, inclusive.

10. A film-forming addition copolymer comprising the reaction product of:
(a) a monomer of the formula:

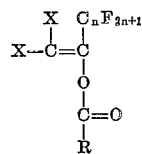

wherein R is selected from the group consisting of alkyl and phenyl radicals, each X is selected from the group consisting of hydrogen, fluorine and chlorine, and $n$ is an integer from 1 to 2, inclusive, and
(b) an ethylenically unsaturated monomer polymerizable therewith.

11. A copolymer as defined in claim 10 wherein each X is hydrogen.

12. A copolymer as defined in claim 11 wherein $n$ is 1.

13. A copolymer, as defined in claim 10, which is the reaction product of vinyl trifluoroacetate and 2-acetoxy-3,3,3-trifluoropropene.

14. A copolymer, as defined in claim 10, which is the reaction product of vinyl acetate and 2-acetoxy-3,3,3-trifluoropropene.

15. A copolymer, as defined in claim 10, which is the reaction product of styrene and 2-acetoxy-3,3,3-trifluoropropene.

16. A copolymer, as defined in claim 10, which is the reaction product of vinylidene chloride and 2-acetoxy-3,3,3-trifluoropropene.

17. A copolymer, as defined in claim 10, which is the reaction product of vinyl acetate and 2-trifluoroacetoxy-3,3,3-trifluoropropene.

18. A copolymer, as defined in claim 10, which is the reaction product of styrene and 2-trifluoroacetoxy-3,3,3-trifluoropropene.

19. A copolymer, as defined in claim 10, which is the reaction product of vinyl trifluoroacetate and 2-trifluoroacetoxy-3,3,3-trifluoropropene.

20. A film-forming addition copolymer comprising
(a) units of the formula:

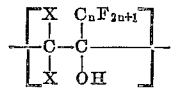

wherein each X is selected from the group consisting of hydrogen, fluorine and chlorine and $n$ is an integer from 1 to 2, inclusive, and (b) units derived from an ethylenically unsaturated monomer polymerized therewith.

21. A copolymer as defined in claim 20 wherein X is hydrogen.

22. A copolymer as defined in claim 21 wherein $n$ is 1.

23. A copolymer as defined in claim 20 which is the hydrolyzed reaction product of vinyl trifluoroacetate and 2-acetoxy-3,3,3-trifluoropropene.

24. A copolymer as defined in claim 20 which is the hydrolyzed reaction product of vinyl acetate and 2-acetoxy-3,3,3-trifluoropropene.

25. A copolymer as defined in claim 20 which is the hydrolyzed reaction product of styrene and 2-acetoxy-3,3,3-trifluoropropene.

26. A copolymer as defined in claim 20 which is the hydrolyzed reaction product of vinylidene chloride and 2-acetoxy-3,3,3-trifluoropropene.

27. A copolymer as defined in claim 20 which is the hydrolyzed reaction product of vinyl acetate and 2-trifluoroacetoxy-3,3,3-trifluoropropene.

28. A copolymer as defined in claim 20 which is the hydrolyzed reaction product of styrene and 2-trifluoroacetoxy-3,3,3-trifluoropropene.

29. A copolymer as defined in claim 20 which is the hydrolyzed reaction product of vinyl trifluoroacetate and 2-trifluoroacetoxy-3,3,3-trifluoropropene.

30. A light-polarizer comprising a sorption complex of a dye material in a film of a copolymer comprising
(a) units of the formula:

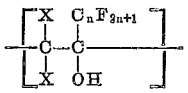

wherein X is selected from the group consisting of hydrogen, fluorine and chlorine and $n$ is an integer from 1 to 2, inclusive, and
(b) units derived from an ethylenically unsaturated monomer polymerized therewith.

31. The invention of claim 30 wherein said copolymer comprises the hydrolyzed reaction product of vinyl acetate and 2-acetoxy-3,3,3-trifluoropropene.

References Cited

UNITED STATES PATENTS 2,472,811 6/1949 Dickey.
2,472,812 6/1949 Dickey.

JOSEPH L. SCHOFER, *Primary Examiner.*

STANFORD M. LEVIN, *Assistant Examiner.*

U.S. Cl. X.R.

260—37, 87.1, 87.3, 89.1, 91.3, 487, 488; 350—148